Figure 1:
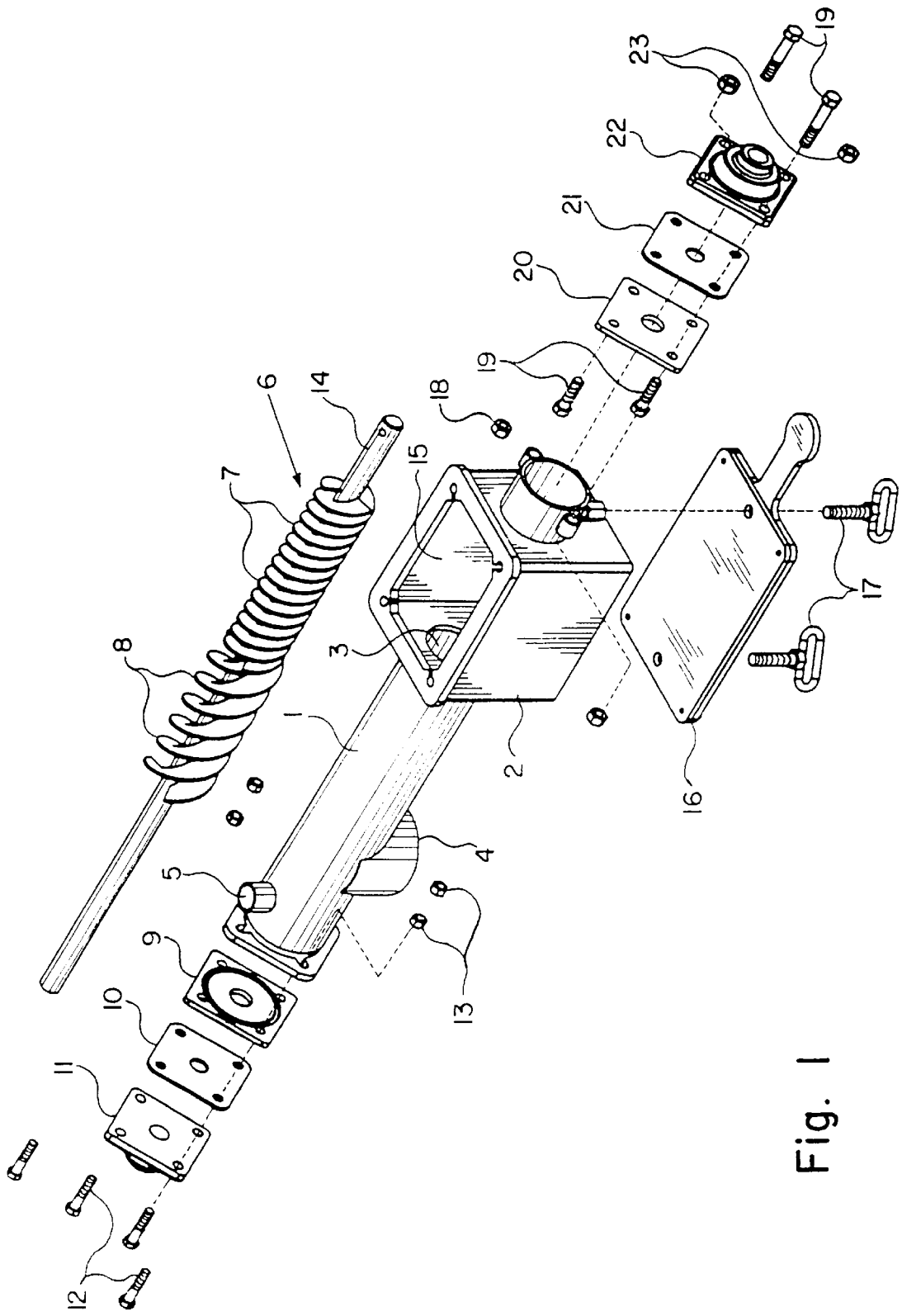
Figure 2:
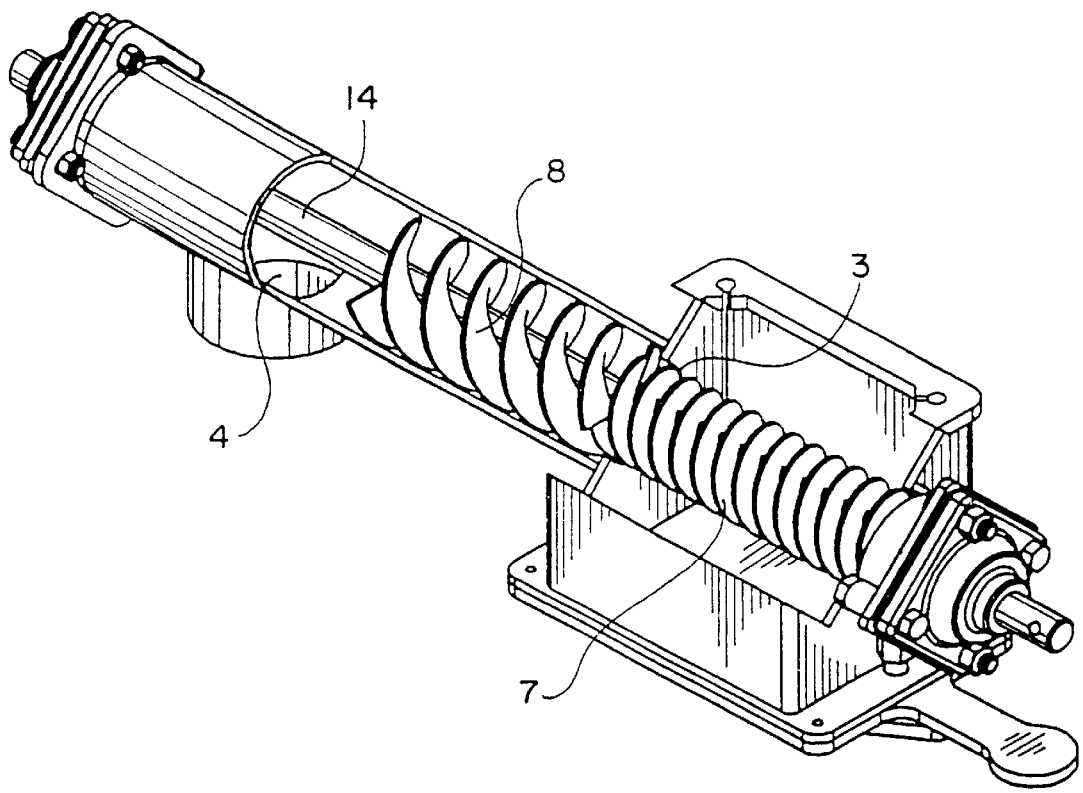
Figure 3:
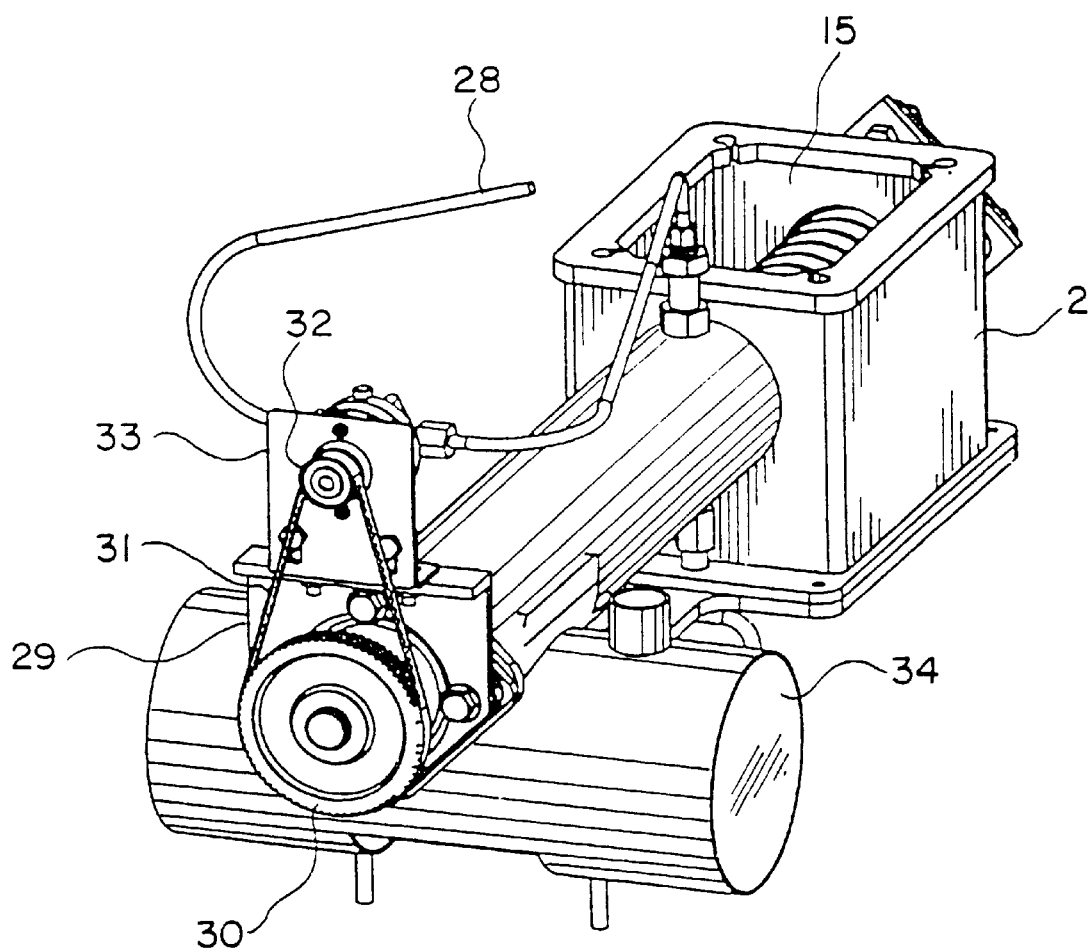
Figure 4:
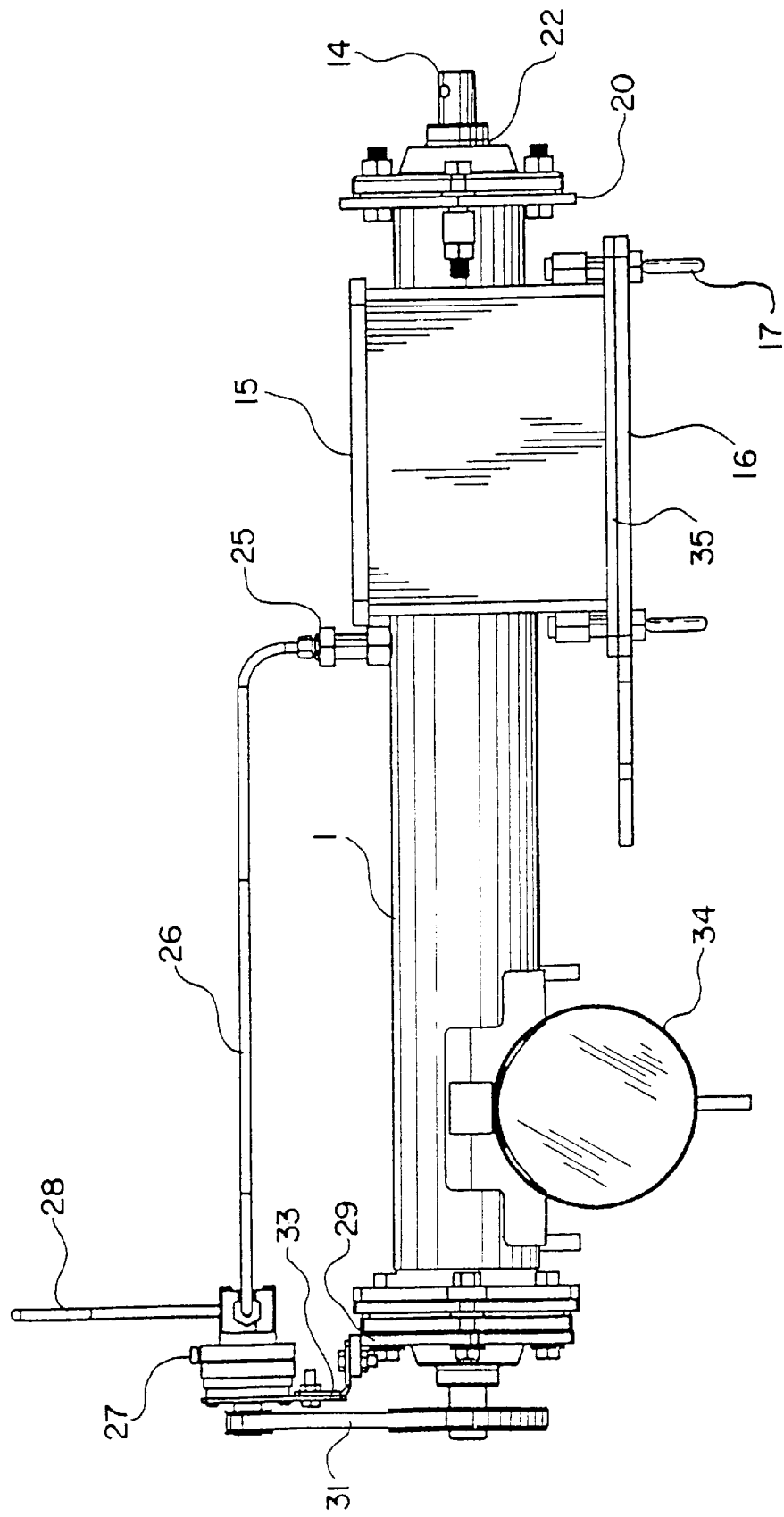
Figure 5:
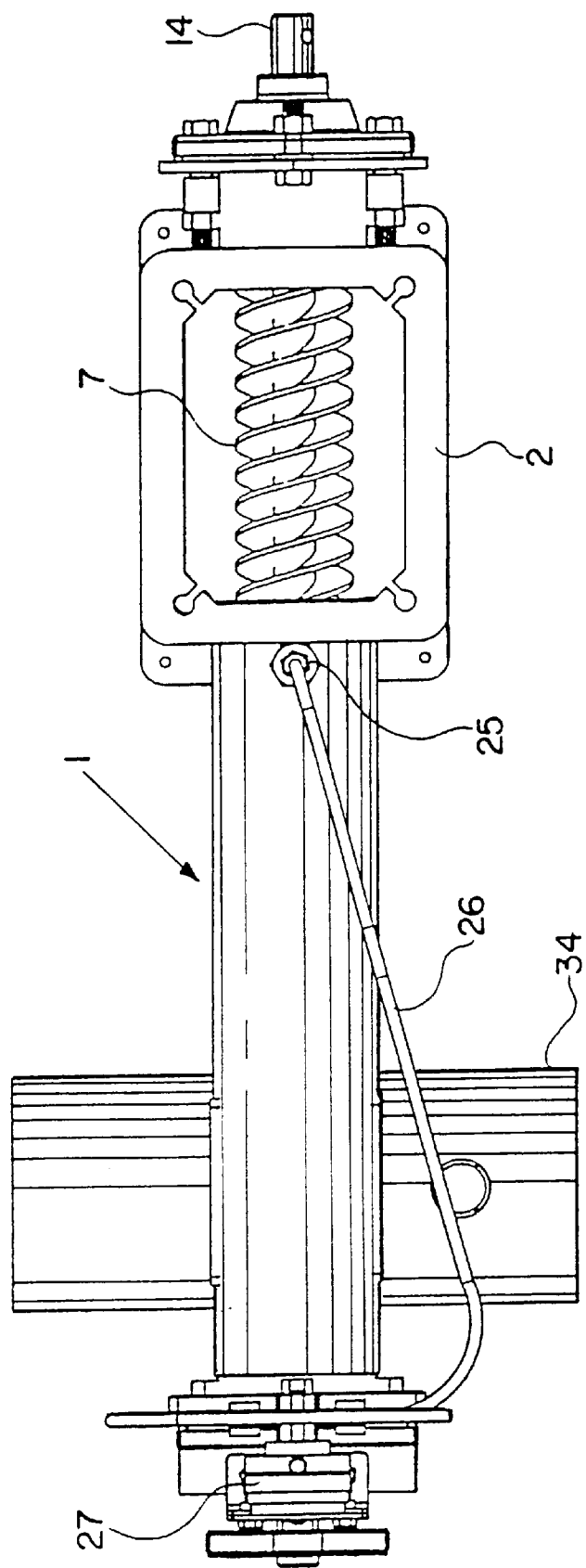
Figure 6:
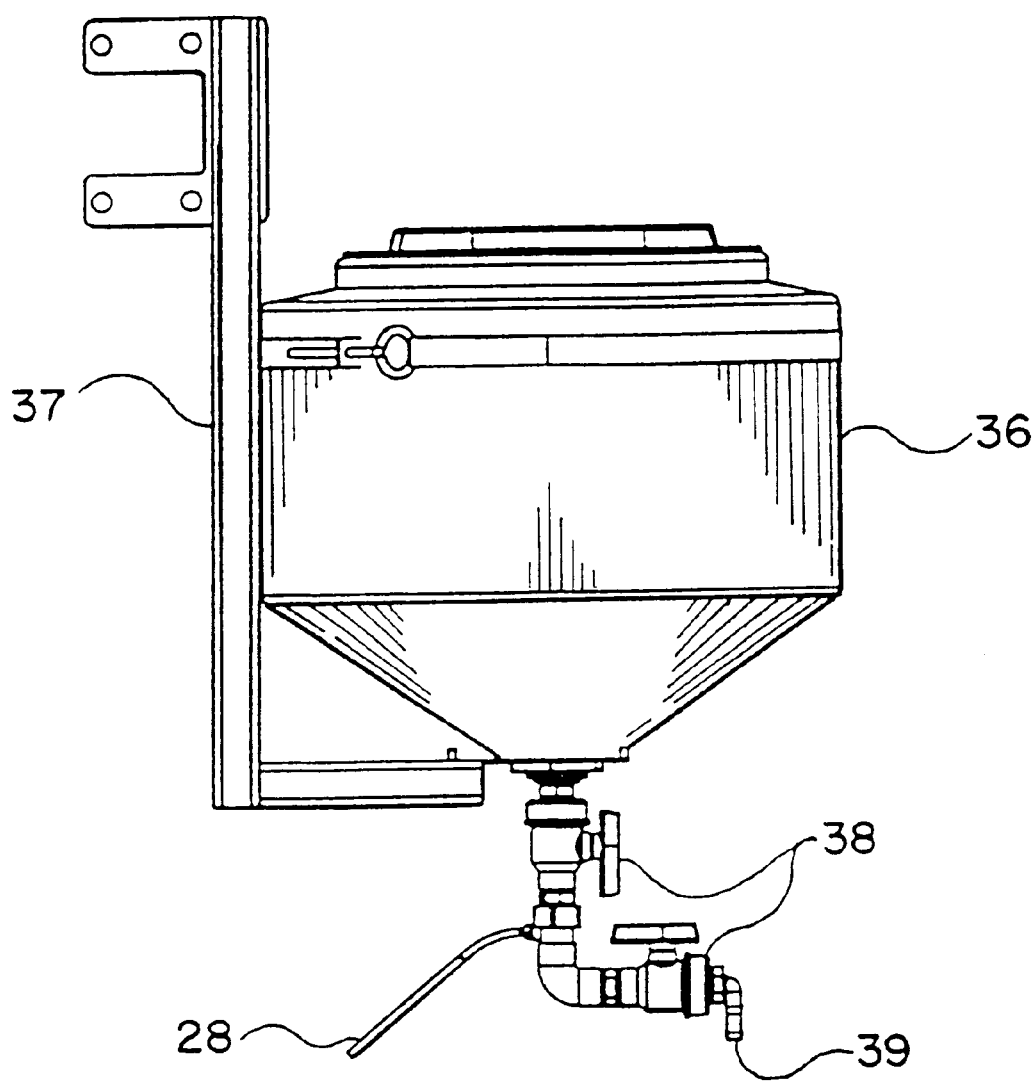

United States Patent
Borstmayer et al.

[19]

[11] Patent Number: 6,112,679
[45] Date of Patent: Sep. 5, 2000

[54] LIQUID APPLICATION UNIT FOR AIR SEEDERS

[76] Inventors: Darren Borstmayer, 221 4th Avenue, Box 38; Ian Rheaume, Box 243, both of St. Brieux, Saskatchewan, Canada, S0K 3V0; Mark Cresswell, Box 4106, Melfort, Saskatchewan, Canada, S0E 1A0

[21] Appl. No.: 09/356,607

[22] Filed: Jul. 19, 1999

[51] Int. Cl.[7] .................................................. A01C 19/02
[52] U.S. Cl. .......................................... 111/173; 111/177
[58] Field of Search ..................................... 111/120, 118, 111/129, 170, 173, 176, 177, 188, 200, 63, 64, 65, 77, 925

[56] References Cited

U.S. PATENT DOCUMENTS

| | | | |
|---|---|---|---|
| 2,596,898 | 5/1952 | Hoppes | 111/173 X |
| 2,906,436 | 9/1959 | Oehler et al. | 111/173 X |
| 3,558,015 | 1/1971 | Hardesty | 111/173 X |
| 5,009,175 | 4/1991 | Pember et al. | 111/173 |
| 5,937,773 | 8/1999 | Maddoux et al. | 111/173 |

OTHER PUBLICATIONS

Flexi–Coil Dryland: Seed Treatment Unit—website pages (Oct. 16, 1999).

*Primary Examiner*—Christopher J. Novosad
*Attorney, Agent, or Firm*—Michael Best & Friedrich LLP

[57] ABSTRACT

A liquid application unit for use on air seeders is provided which is cost-effective, has low maintenance and is highly reliable. This unit permits farmers to apply liquid substances, i.e. seed treatment substances to particulate material, namely seeds, just prior to the seed being inserted into the soil. The system uses an auger having two different pitches of flighting and/or different diameter flighting such that the volume available in between pitches of the flighting on the portion of the auger outboard of the orifice is greater than the volume available between the pitches inboard of the orifice. Chemicals are applied downstream of a sump area where the auger has either a larger pitch or larger diameter such that the volume available to the seed in the downstream area of the sump is greater. This will allow for better mixing action and minimize any effects on metering accuracy caused by build-up of chemicals on the flighting. In this device seed and chemicals are mixed by the rotation of the auger flighting within its cylinder.

36 Claims, 6 Drawing Sheets

LIQUID APPLICATION UNIT FOR AIR SEEDERS

This invention relates to air seeders generally used for inserting fertilizer or seed into agricultural fields. More particularly, this invention relates to a metering auger/chemical applicator system which is attached directly to an air seeder.

BACKGROUND

Farmers are continually seeking methods that allow them to farm more efficiently. They are also concerned about disposing of treated seed which can create an environmental hazard to animals.

It is an object of present invention to provide a highly cost-effective, low maintenance and highly reliable liquid application unit for use on air seeders to provide farmers with the ability to apply liquid substances to particulate matter only as it is being consumed for insertion into the soil.

It is also an object of the present invention to have an effective system which compensates for instantaneous changes in material application rate, to keep the amount of seed treatment per bushel of grain constant.

It is also an object of the present invention to provide a system or delivery unit which allows for variances in ground speed in order that the rate of product metered per hour changes accordingly.

SUMMARY OF THE INVENTION

The inventors of the present invention have found that a two-pitch or two-diameter metering screw is an effective way to accurately meter, mix seed and liquid treatment and to discharge material into an air stream of an air seeder. A sump is located and attached to the bottom of the bins of the air seeder cart. The area of the sump is much wider than the width taken up by the flighting. This minimizes the amount of drag on the metering screw and allows particulate to flow around the screw to ensure complete filling of the flighting. In a preferred embodiment, the flighting located in the sump before the downstream orifice has a smaller pitch and is of smaller diameter than the flighting which is located after the downstream orifice. This ensures that the larger flighting cannot be a bottleneck in the metering system and will also provide for good mixing action for the seed and liquid seed treatment.

The invention includes a metering screw assembly, a metering screw housing, a liquid metering pump, at least one liquid treatment injection port and a liquid holding tank all attached to the air seeder. The metering screw assembly includes flighting attached to shafting such that the shafting extends past both ends of the screw flighting. The liquid metering pump communicates directly with the metering screw assembly to instantaneously adjust the output of the pump as to the rotational speed of the metering screw.

A sheave is placed on one end of the shafting supporting the flighting. A driven sheave is either placed on or attached directly or indirectly to the input shaft of the metering pump, depending on the location of the pump. The drive and driven sheaves are connected by an endless belt or chain. In a preferred embodiment, the sheaves and belt are notched to provide positive drive.

A holding tank contains one or more liquid chemicals and a tubular line connects the holding tank to the input port of the pump. The output of the pump is connected by a tubular line to the injection port(s) located on the housing downstream of the sump. In a preferred embodiment, the injection port(s) is(are) located just downstream of where the transfer tube portion of the metering screw housing and the inner sump wall connect.

On the bottom of the sump is located a removable cover which, once removed, allows complete emptying of the air seeder bin. The sump also has openings on both ends for the metering screw. The diameter of the hole in the outboard end of the sump is slightly larger than the diameter of the metering screw shaft. On the inboard end of the sump, the strategically sized hole acts as an orifice and interacts with a metering screw to produce consistent and predictable metering.

One or more injection port(s) is(are) located on the transfer tube downstream of the orifice located in the sump. Injectors are typically nozzles for dispersing liquid over a large area on the particulate materials as they pass. The particulate material is further acted upon by the rotation and translation of the metering screw which further assists to distribute the liquid more uniformly over the outer surfaces of the seed or other treated particles. When the particulate material exits the metering assembly it has the liquid treatment efficiently and uniformly applied to the particulate material so that no further mixing action is required although more may occur in the air stream.

In normal operation, the metering assembly moves the treated material into the transfer ducts that contain a high-speed air stream. The air stream carries the treated material away from the air seeder bins to be deposited either in or on top of the soil. In a preferred embodiment, the metering pump is a positive displacement piston pump and is connected by belts and sheaves to communicate with a metering screw. For a given product, the output of the metering system increases as the rotation speed of the metering screw increases, as does the output of the pump. Normally, the particulate requires a specific amount of liquid treatment per pound of material. The output per revolution of the pump can be varied by changing the stroke that the piston displaces. This allows the operator to vary the output of the metering pump to match the particular requirements of different treatments and materials.

Therefore this invention seeks to provide an improved metering auger assembly for use with an air seeder cart; said assembly including an auger, a sump and a downstream housing fixedly attached to said sump; said downstream housing further including a liquid chemical injection means adapted in operation to spray liquid pesticides or herbicides on particulate matter; said sump being in open communication with particulate within said air seeder cart, and said downstream housing including a discharge port at one end remote from said sump; the improvement being a first portion of said auger is adapted to rotate within said sump and the second portion is adapted to rotate within said downstream housing; wherein, in operation, said first portion having a lesser volume available between adjacent pitches of the flighting for each revolution of said auger than said second portion.

This invention further seeks to provide a system attached to an air seeder for applying liquids to particulate materials including: a) a metering screw housing capable of receiving particulate materials from an air seeder bin, b) a tank for holding said liquids, c) at least one liquid injection port located in said metering screw housing for receiving and dispersing said liquids, d) a metering screw assembly rotatable within said metering screw housing and capable of accurately metering said particulate materials into transfer ducts used to convey said particulate materials to an implement delivering said particulate material into or onto an agricultural field, e) a liquid metering pump in direct communication with said metering screw assembly, said liquid metering pump capable of receiving said liquid from said holding tank and delivering said liquid to said liquid injection port where said metering pump's output varies proportionally with a change in the rotational speed of said metering screw assembly.

BRIEF DESCRIPTION OF THE DRAWINGS

The invention will be more accurately described in conjunction with the following drawings wherein:

FIG. 1 is an exploded view of the basic auger system without chemical injection;

FIG. 2 is a perspective cut away view of the auger without the chemical injection system;

FIG. 3 is a perspective view of the auger, along with the pump, drive sheaves and injector;

FIG. 4 is a side view of the present invention;

FIG. 5 is a top view of the present invention; and

FIG. 6 is a side view of the holding tank.

DETAILED DESCRIPTION OF THE INVENTION

In FIGS. 1 and 2 there is a downstream metering housing or transfer tube 1. It is connected to a sump 2 which has a discharge orifice 3. The downstream metering housing 1 is equipped with a discharge port 4. In this embodiment a pressurization port 5 is also used.

The metering screw assembly is shown generally as 6. It has a first section of flighting 7 which, in this embodiment, is of lesser diameter and generally of smaller pitch. This portion of the metering auger is adapted to rotate within the sump 3 and carries a smaller volume per each revolution. Located on the shaft 14 is a downstream portion of the metering auger 8 which, in this embodiment, has a wider diameter flighting as well as larger pitch. However, it is to be understood that all that is necessary for the invention is that the downstream portion be capable of carrying a larger volume per revolution than the upstream portion located in the sump. This ensures that particulate material is basically moved translationally rather than rotationally in the downstream portion and therefore ensures that the seed and liquid seed treatment will mix adequately.

On the downstream end of a first embodiment of the invention is a connecting block 9 over which is placed a gasket 10 and a bearing 11. Bolts 12 and nuts 13 secure the bearing, gasket and connecting block to the downstream end of the metering housing 1. Shaft 14 of the metering screw assembly rotates with the bearings 11 at one end and 22 at the opposite end of the sump 2.

The sump has an open top or housing inlet 15 which is secured to the bottom of the hopper of an air seeder bin (not shown). The sump is also equipped with a lower clean out cover which is fastened to the bottom of the sump by means of wing bolts 17. Both the sump and the air seeder hopper can be completely cleaned out, when seed changeover is necessary. On the upstream side of the sump, nuts and bolts 18, 22 and 19 secure the connecting block 20, gasket 21 and bearing 22 to the sump.

FIG. 2 illustrates a first embodiment of the invention without the chemical injection apparatus. One notes the significant difference in the size and pitch of the two parts of auger assembly 3.

FIGS. 3, 4 and 5 show a preferred embodiment of the invention. An injection port 25 is secured just downstream of the sump discharge orifice 3. The injection port 25, which is a wide spread nozzle, carries liquid herbicide or pesticide from hose 26 which is connected to pump 27. Particulate material passing through downstream metering housing 1 is broadly covered with such liquid such that when the seed leaves the airstream duct 34 it is completely covered and ready to be placed in or on the soil.

Pump 27 is a chemical pump which could be a positive displacement piston pump. Liquid is supplied to the pump by a hose 28 which leads from the holding tank 36 shown in FIG. 6. Metering screw housing adapter 29 is attached to downstream metering housing. Metering screw shaft 14 is equipped with a driving sheave 30 which connects to a driven sheave 32 on the liquid metering pump 27 by way of a notch belt 31. A pump support bracket 33 is attached to metering screw housing adapter 29.

The chemically treated seed or particulate matter is discharged into and through air stream duct 34 which communicates with a high speed blower fan and distributes seed or other particulate matter to various manifolds and discharge hoses located on a agricultural planting implement. As shown, most clearly in FIG. 4, a clean-out cover gasket 35 is located between clean-out cover 16 and sump 2. The liquid chemical holding tank 36 is secured to an air seeder (not shown) by bracket 37. The holding tank 36 is equipped with various valves 38 and a clean out drain 39. Normally, lower valve 38 is open and drain 39 is closed and liquid runs through tank hose 28 to the pump 27.

With this arrangement the metering auger assembly 6 rotates proportionately to ground speed and similarly the pump turns proportionately to the metering auger assembly 6, although at a much quicker rate. Thus, regardless of ground speed the correct amount of chemically covered particulate seed is dispersed evenly to each acre of farm land.

What is claimed is:

1. An improved metering auger assembly for use with air seeder bins;

said assembly including an auger, a sump and a downstream housing fixedly attached to said sump;

said downstream housing further including a liquid chemical injection means adapted in operation to spray liquid pesticides or herbicides on particulate matter;

said sump being in open communication with particulate within said air seeder bins;

and said downstream housing including a discharge port at one end remote from said sump;

the improvement being a first portion of said auger is adapted to rotate within said sump and a second portion is adapted to rotate within said downstream housing;

wherein, in operation, said first portion of said auger has less volume between adjacent pitches of flighting than said second portion.

2. An auger assembly as claimed in claim 1 wherein flighting on said first portion of said auger has a lesser diameter than flighting on said second portion.

3. An auger assembly as claimed in claim 1 wherein flighting on said first portion of said auger has a lesser pitch than flighting of said second portion.

4. An auger assembly as claimed in any one of claim 1 wherein said liquid chemical injection means includes an injector nozzle.

5. An auger assembly as claimed in claim 1 wherein said liquid chemical injection means includes an injector nozzle and a pump.

6. An auger assembly as claimed in claim 5 wherein said pump is driven by said shaft of said auger.

7. An auger assembly as claimed in claim 5 wherein said pump is driven by a shaft of said auger;

said shaft and said pump including driving and driven sheaves respectively;

said sheaves being connected to one another by an endless belt, such that said pump operates proportionately to the rotational speed of said auger.

8. An auger assembly as claimed in claim 7 wherein said pump and said auger rotate proportionally to the speed of said air seeder cart.

9. An auger assembly as claimed in claim 5 wherein said pump is driven by a shaft of said auger; said shaft and said pump including driving and driven sprockets respectively; said sprockets being connected to one another by an endless chain, such that said pump operates proportionately to rotational speed of said auger.

10. An auger assembly as claimed in claim 5 wherein said pump is connected to said downstream housing by a first bracket and said holding tank is connected to said air seeder cart by a second bracket.

11. An auger assembly as claimed in claim 1 wherein said liquid chemical injection means includes an injector nozzle, a pump and a liquid holding tank.

12. An auger assembly as claimed in claim 1 wherein said liquid chemical injection means includes an injector nozzle, a pump, a liquid holding tank and hoses connecting pump to holding tank and pump to injector nozzle.

13. An auger assembly as claimed in claim 1 wherein said sump includes a lower clean-out door, such that in operation the entire contents of said sump and at least one hopper on said air seeder cart can be removed.

14. A method of applying seed, coated with fungicides or herbicides comprising the steps of:

1) directing seed from a hopper of an air seeder cart into a sump;
2) moving seed through said sump with an auger comprising flighting of lesser pitch and diameter;
3) moving said seed within a downstream housing with an auger comprising flighting of greater pitch and diameter;
4) injecting liquid chemical into said downstream housing such that rotational movement of said auger causes complete coverage of seed;
5) discharging coated seed from said housing into a discharge duct receiving air from a blower fan;
6) blowing said seed through a plurality of ducts to soil engaging implements.

15. A system attached to an air seeder for applying liquids to particulate materials including:

a) a metering screw housing capable of receiving particulate materials from an air seeder bin,
b) a tank for holding said liquids,
c) at least one liquid injection port located in said metering screw housing for receiving and dispersing said liquids;
d) a metering screw assembly rotatable within said metering screw housing and capable of accurately metering said particulate materials into transfer ducts used to convey said particulate materials to an implement delivering said particulate material into or onto an agricultural field,
e) a liquid metering pump in direct communication with said metering screw assembly, said liquid metering pump capable of receiving said liquid from said holding tank and delivering said liquid to said liquid injection port wherein metering pump output varies proportionally with a change in rotational speed of said metering screw assembly.

16. A system as in claim 15 wherein said metering screw housing has an inlet port for receiving particulate materials from said air seeder bin.

17. A system as in claim 15 wherein said metering screw housing includes an outlet port.

18. A system as in claim 15 wherein said metering screw housing includes a transfer tube for transferring said particulate materials from said inlet to said outlet.

19. A system as in claim 15 wherein said metering housing includes a sump, the width of said sump being greater than the width of the portion of the metering screw assembly located within the sump.

20. A system as in claim 15 wherein said metering screw assembly is comprised of flighting and shafting.

21. An injection port as in claim 15 for applying said liquid onto the surfaces of said particulate materials.

22. A liquid pump as in claim 15 which includes an inlet port for receiving said liquids from a holding tank and an exit port for delivering said liquids to said injection port.

23. A liquid metering pump as in claim 15 wherein the output of said liquid metering pump can be varied by means other than by varying the speed of rotation of the said liquid metering pump.

24. A liquid metering pump as in claim 15 wherein said liquid metering pump is a positive displacement pump.

25. A liquid metering pump as in claim 24 wherein the output of said positive displacement piston pump is varied by changing the volume that the piston displaces in an in-and-out cycle.

26. A liquid metering pump as in claim 15 rotatably driven by the rotation of said metering screw shaft.

27. A liquid metering pump as in claim 15 wherein the output of said liquid metering pump can be adjusted to deliver a nominal liquid application rate for a prescribed amount of particulate materials.

28. A system as in claim 15 wherein said particulate materials which exit said metering screw housing are directed into a duct carrying an air stream.

29. A system as in claim 15 wherein the mixing effect that said metering screw assembly and metering screw housing have upon the particulate material help create uniform application of said liquid onto the surfaces of said particulate materials.

30. A system as in claim 15 wherein said metering screw is composed of flighting with two different pitches.

31. A sump as in claim 30 wherein said pump includes a metering orifice.

32. A system as in claim 30 wherein said metering screw assembly increases in pitch just outboard said orifice.

33. A system as in claim 30 wherein said metering screw assembly increases in pitch and diameter just outboard said orifice.

34. A system as in claim 15 wherein said metering screw is composed of flighting with two different pitches and diameters.

35. A metering screw assembly as in claim 15 wherein said metering screw has an inboard end which corresponds to said inlet end of said metering screw housing and an outboard end which correspond to said outlet end of said metering screw housing and where the pitch of said outboard end is greater than the pitch of said inboard end.

36. A metering screw assembly as in claim 15 wherein said metering screw has an inboard end which corresponds to said inlet end of said metering screw housing and an outboard end which corresponds to said outlet end of said metering screw housing and where the pitch and diameter of said outboard end are both greater than the pitch and diameter of said inboard end.

* * * * *

UNITED STATES PATENT AND TRADEMARK OFFICE
CERTIFICATE OF CORRECTION

PATENT NO : 6,112,679
DATED : September 5, 2000
INVENTOR(S): Darren Borstmayer, Ian Rheaume, Mark Cresswell It is certified that error appears in the above-identified patent and that said Letters Patent are hereby corrected as shown below:

Claim 4, column 4, line 60, delete "any one of".

Claim 24, column 6, line 25, after "displacement" and before "pump", insert --piston--.

Claim 31, column 6, line 46, delete "sump" and insert --system--.

Signed and Sealed this

Fifteenth Day of May, 2001

*Attest:*

NICHOLAS P. GODICI

*Attesting Officer*  *Acting Director of the United States Patent and Trademark Office*